3,030,214
METHOD OF FREEZING FOOD PRODUCTS OF SMALL UNIT SIZE AND PRODUCT OBTAINED THEREBY
Claude R. Miller, 2222 Fidelity Union Tower, Dallas, Tex.
No Drawing. Filed Feb. 23, 1960, Ser. No. 10,016
5 Claims. (Cl. 99—192)

This invention relates to methods of freezing food products for preserving them, and particularly to such methods peculiarly adapted to the freezing of food products of small unit size, such as rice, peas, corn, etc., and to the product formed thereby. This application is a continuation-in-part of application Serial No. 743,470, filed June 20, 1958, now abandoned.

The desirability of having a so-called "loose pack," that is, a free flowing frozen product, has long been recognized. When the units of the pack are not frozen together but are loose and free flowing, many advantages are obtained. Small quantities may be removed from the pack by the spoonful, or cupful, and the remainder put back in the freezer for subsequent use. It is no longer necessary to cut, or saw, desired portions from a solid frozen block. The frozen product, being in small separate units will thaw more quickly and thus the product may be more readily prepared for serving.

The "loose pack" is not a new frozen product; it has been produced before. With all known methods for preparing this product, however, elaborate steps and equipment are required. This naturally increases the time and cost of preparing the product, and necessitates a premium charge.

The object of the present invention is to provide a simple method of freezing food products of small unit size to produce a product similar to the known "loose pack."

A more specific object of the invention is to provide a method of freezing such products whereby the frozen product is in small separate fragments consisting of one or several adhered units of the food product.

Another object of the invention is to provide a method for freezing food products wherein a layer of the product is formed into an integral sheet by adhering the food units by a frost bond, and the sheet broken along lines of joinder between the several units to provide small separated fragments, or units.

A further object is to provide such a method which can be carried out without special equipment.

Yet another object of the invention is to provide frozen foods in a new form produced according to the herein disclosed method.

Other objects of the invention will appear as the following description of practical embodiments thereof proceeds.

In general, the invention pertains to methods of freezing food products of small unit size which consists essentially in preparing a very thin layer of the product and forming it into a sheet having a weak frost bond between the units of the layers and then shattering the sheet to provide small pieces of the product. This will provide a loose dry product which will be immediately subjected to deep freezing. It will be understood that the method of the present invention, while designed primarily for the preserving of rice, is equally adapted to the freezing of all small unit size food products such as corn, peas, etc. The method will be described as for rice.

Going more into detail, the product is first cooked in a conventional vessel, but the cooking is done with about 75% (more or less) of the usual amount of water, and the cooking time is reduced to about 90% of normal. This amounts to approximately one and one-half pounds of water for each pound of rice and, when using parboiled rice, a cooking time of about twenty-two minutes. If white rice is used, the cooking time will be about thirteen minutes. This provides a thoroughly loose grained flowable product.

The cooked product is then spread out in a very thin layer. This can be done on trays, sheets, screens, moving belts, etc., in fact, any flat surface will be suitable. Although considerably thicker layers can be used satisfactorily, it has been found that best results are obtained when the layers are from one to three units in thickness. In other words, the layers should not be thicker than three of the units being frozen superposed upon one another, for example, if rice is being processed, the layer should not be thicker than three grains. As will be evident, this will be quite a thin layer.

After the product layer is prepared, it is formed into an integral sheet by lowering the temperature of the product. The product will be moist, and, if the temperature of the rice is brought to approximately the freezing point, a weak frost bond will be formed between the individual units and they will be adhered to one another to form a sheet. If the temperature is not substantially below the freezing point, the frost bond between the units will be relatively slight and easily ruptured. This condition, where the external moisture on the units is frozen, yet the units of the layer are joined by a weak frost bond which is readily fracturable, may be brought about by two methods which have been found to be practical.

Following the first of these methods, the rice layer is frozen into a solid sheet by lowering the temperature of the mass to 25° F. to 30° F. This will cause the moisture throughout the rice grains to become frozen and the grains to be adhered to one another along irregular lines of adherence which run through the sheet in all directions. After complete freezing, the temperature of the mass will be raised to 30° F. to 32° F., which will cause the frost bond between the food units making up the layer to become weak, and easily fractured. The sheet will be removed from the tray and struck, dropped, or otherwise given a blow, and it will fracture along the lines of adherence between the food units. The resulting product will contain some free grains, and other particles of two or more adhered grains. As the temperature is not to rise above the freezing point, the product will be dry and the particles will not adhere to one another. The product is then deep frozen to temperatures of 0° F. or below, and packed in conventional manner for storage or shipment. Care must be taken that no thawing takes place until the product is removed from the package for use.

The second way of preparing the sheet with a weak frost bond between the units, is to form the layer as before, and then lower the temperature of the mass to 30° F. to 32° F. This will cause the moist food units to frost and the units to adhere to one another so that a sheet is formed, but here again the frost bond between the units will be weak and easily fractured. The sheet will be shattered as before, the resulting product subjected to deep freeze, and the frozen product packaged for storage or shipment.

It will be evident that food products prepared in either of the above-described manners will provide a free flowing pack. The package may be opened, desired quantities of the product removed, and the package returned to the freezer. The pack will remain free flowing so long as thawing and refreezing does not take place.

While in the above one practical manner of carrying out the invention has been disclosed, it will be apparent

What is claimed is:

1. A method for preparing a flowable frozen pack of food products of small unit size comprising, cooking the product, spreading the product in a thin layer, causing the spread product to be a readily fracturable sheet with the food units adhered by a weak frost bond by subjecting the layer to temperatures in the range of 30° F. to 32° F., shattering the sheet into small particles by imparting a blow to the sheet, and deep freezing the resultant product of small particle size.

2. A method for preparing a flowable frozen pack of food products of small unit size as claimed in claim 1 wherein the deep frozen product is packed in containers while frozen.

3. A method for preparing a flowable frozen pack of food products of small unit size comprising, cooking the product, spreading the product in a thin layer, subjecting the layer to temperatures in the range of 25° F. to 30° F. to freeze the product into a sheet with the units adhered to one another along irregular lines of juncture extending in all directions throughout the sheet, subjecting the sheet to temperatures in the range of 30° F. to 32° F. to cause the frost bond between the individual product units to be a weak one and the sheet readily fracturable, imparting a blow to the sheet to shatter it into small particles, and deep freezing the resultant product of small particle size.

4. A method for preparing a flowable frozen pack of food products of small unit size as claimed in claim 3 wherein the deep frozen product is packed in containers while frozen.

5. A flowable frozen food product prepared according to the method set out in claim 1.

References Cited in the file of this patent

UNITED STATES PATENTS

| | | |
|---|---|---|
| 2,221,220 | Pack | Nov. 12, 1940 |
| 2,284,270 | Eberts et al. | May 26, 1942 |
| 2,424,870 | Welling et al. | July 29, 1947 |
| 2,828,211 | Sanders | Mar. 25, 1958 |
| 2,938,802 | Miller | May 31, 1960 |